April 14, 1964

R. A. LOGAN 3,129,343

LOGARITHMIC FUNCTION GENERATOR

Filed Dec. 13, 1961

INVENTOR
R. A. LOGAN
BY
ATTORNEY

United States Patent Office 3,129,343
Patented Apr. 14, 1964

3,129,343
LOGARITHMIC FUNCTION GENERATOR
Ralph A. Logan, Morristown, N.J., assignor to Bell Telephone Laboratories, Incorporated, New York, N.Y., a corporation of New York
Filed Dec. 13, 1961, Ser. No. 159,064
3 Claims. (Cl. 307—88.5)

This invention relates to logarithmic function generators, and, more particularly, to such generators utilizing the properties of solid state devices to produce a logarithmic output.

Logarithmic function generators are useful in a variety of applications. In analog computers, for example, the currents and voltages generated within the computer are indicative of angular distance, or other dimensional relationships. It is often necessary that certain of these relationships be multiplied together, and, obviously, it is much simpler to convert the voltages or currents to logarithms, which can then be added, than it is to perform a straight multiplication operation.

Logarithmic generators are also useful in ranging equipment, such as sonar or radar where, because of the attenuation of the medium through which the sonar or radar pulses pass, the brightness of the displayed pulses is uneven, decreasing with increasing distance. The use of logarithmic generators or amplifiers produces a substantially uniform brightness in the display, regardless of distance.

Generally speaking, heretofore rather complex circuitry has been necessary in order to achieve reliable, accurate logarithmic generation. With the increasing emphasis on both miniaturization and light weight, especially in the field of airborne equipment, the complexity of the logarithmic generator circuits, with attendant bulkiness, weight and large number of components has not been conducive to the achievement of the ultimate in small size and lightness.

Accordingly, it is an object of the present invention to reduce the complexity of a logarithmic function generator, with a consequent decrease in size, weight, and number of components of the over-all arrangement.

It is another object of the present invention to decrease substantially the cost and difficulty of construction of a logarithmic function generator.

The present invention is based upon my discovery that, under proper conditions of bias, which will be discussed hereinafter, the current-voltage characteristic of a heterojunction device wherein the two semiconductors are of the same conductivity type exhibits a logarithmic variation of current with voltage over an exceedingly wide range. It appears that, regardless of the conductivity type, when a positive voltage of proper magnitude is applied to the material having the larger energy gap, this logarithmic relationship between voltage and current obtains. A heterojunction semiconductor device is generally defined as a semiconductor device having a junction formed by two different materials, usually with different doping levels. This is as opposed to a homojunction device in which the junction is formed between two regions of the same material having different doping levels.

This characteristic of heterojunctions of the type specified is utilized in a first illustrative embodiment of the invention which comprises a p-type gallium phosphide-p-type gallium arsenide heterojunction device connected in series with a signal voltage source and a resistor. An output signal that is a logarithmic function of the signal voltage input is taken across the resistor.

In the second illustrative embodiment of the invention, a heterojunction device of the type used in the first embodiment is connected in parallel with a resistance and in series with a signal current source. The signal current produces a voltage drop across the resistance which biases the device to produce a current in the device which is a logarithmic function of the voltage drop across the resistance, and, hence, of the input current.

It is a feature of the present invention that a heterojunction device in which both semiconductor materials are of the same conductivity type is utilized with appropriate circuitry to produce an output signal that is a logarithmic function of an input signal.

These and other objects and features of the present invention will be readily apparent from the following detailed description, taken in conjunction with the drawings, in which.

Figure 1:
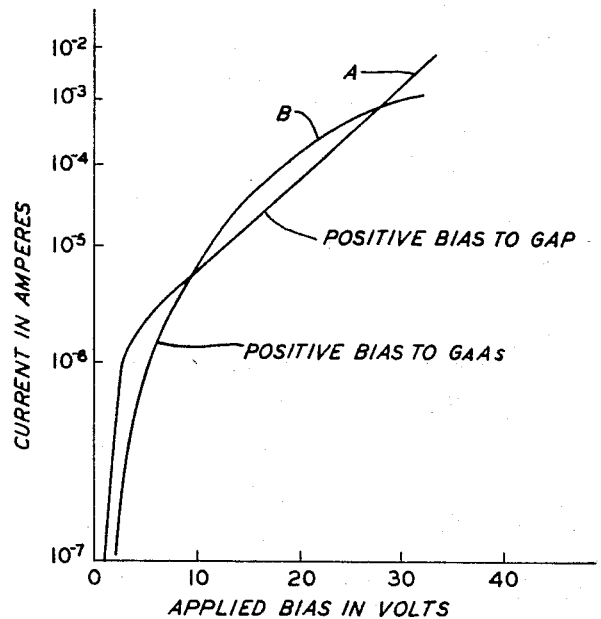
FIG. 1 is a semi-logarithmic plot of the current-voltage characteristic of a heterojunction device where the two semiconductor materials are both of p-type conductivity.

Turning now to FIG. 1, there is depicted the voltage-current characteristic of a gallium phosphide-gallium arsenide heterojunction device wherein both materials are doped to be of p-type conductivity. It is to be understood that the particular heterojunction whose characteristics are depicted is only one of many possible types. The particular one here shown is by way of illustrating the invention, and other materials and conductivity types may be used.

The heterojunction whose characteristics are depicted in FIG. 1 was formed by growing a p-type epi-layer of GaP on a single crystal p-type substrate of GaAs oriented in the 100 direction. An ohmic contact to the GaP was achieved by alloying an evaporated silver layer in a strip heater. The junction was then mounted in a conventional header with silver paste used to contact the GaAs and to attach the unit to the header. A point was pressed against the alloyed silver to contact the GaP layer. The junction area was defined by conventional masking and etching techniques.

From FIG. 1 is is readily apparent that for a positive potential applied to the GaP layer, GaP having a greater energy gap than GaAs, the logarithm of the current varies linearly with applied voltage for voltages greater than approximately five volts.

Figure 2:
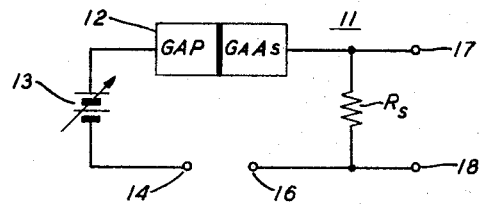
FIG. 2 is a schematic diagram of a first illustrative embodiment of the invention.

Turning now to FIG. 2, the circuit 11 therein depicted is designed to produce an output voltage that bears a logarithmic relationship to the input voltage. Circuit 11 comprises a GaP–GaAs heterojunction 12 of the type whose characteristics are depicted in FIG. 1. Connected in series with heterojunction 12 is a resistor $R_s$, a bais battery 13, and a pair of input terminals 14 and 16 to which a signal input voltage V is applied. In certain applications, where the minimum input voltage V is sufficiently large, bias battery 13 is not necessary and may be eliminated. Similarly, certain materials may produce a heterojunction giving a logarithmic characteristic from zero bias up, in which case battery 13 would not be necessary. Battery 13 is intended to supply a sufficient bias to insure operation on the linear logarithmic portion of the I–V curve, and for this reason it is shown as being adjustable, to accommodate varying conditions of input voltage or junction characteristics.

In circuit 11 of FIG. 2, $R_s$ is preferably of a value approximating one hundred ohms. Inasmuch as the junction impedance approximates a megohm, $R_s$ has a negligible effect on current flow. When a signal voltage V is applied to terminals 14 and 16, current flows in the circuit 11 and the voltage drop across $R_s$ is $$V_s = IR_s \qquad (1)$$

Inasmuch as, from FIG. 1, $$\text{Log } I = KV \qquad (2)$$

where K is a proportionality constant depending on the junction characteristics, then $$\text{Log } V_s = \log I + \log R_s = KV + \log R_s \qquad (3)$$

and $$V_s = R_s \text{ antilog } KV \qquad (4)$$

From Equations 3 and 4 it can be seen that the logarithm of the voltage drop $V_s$ across resistor $R_s$ is proportional to the applied voltage. The output of circuit 11 is taken off at output terminals 17 and 18 for utilization, and, because of the high junction impedance, the current drain on the source of the applied voltage V is negligible.

Figure 3:
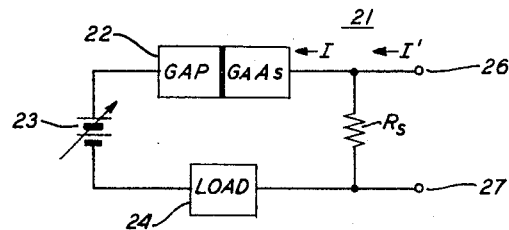
FIG. 3 is a schematic diagram of a second illustrative embodiment of the invention.

The circuit 11 of FIG. 2 functions to produce a logarithmic transformation of voltage. In FIG. 3 there is depicted a circuit 21 which functions to produce a logarithmic transformation of input current. Circuit 21 comprises a heterojunction device 22 of a type whose characteristics are depicted in FIG. 1 connected in series with a bias battery 23 and a load 24, and in parallel with a resistance $R_s$. The current $I'$ to be transformed is introduced through terminal 26, passes through resistor $R_s$, and out through terminal 27. This current produces a voltage drop $$V_s = I' R_s \qquad (5)$$

across $R_s$ which acts to bias the heterojunction device 22 so that a current I flows therethrough. From FIG. 1

$$\text{Log } I = KV_s = KR_s I' \qquad (6)$$

and it can be seen that a logarithmic transformation takes place, log I being the current which flows through load 24. Load 24 may, of course, be any one of a number of devices, for example, it may be a meter, an amplifier, or a subsequent stage in a computer network.

From the foregoing it can readily be seen that logarithmic transformations of both voltages and currents are possible utilizing the principles of the present invention, and such transformations are accomplished in extremely simple circuits which, because of the small number of components and their small size, lend themselves readily to miniaturization applications where light weight is highly desirable.

In a specific embodiment of the invention the heterojunction device utilized was formed by growing a p-type epitaxial-layer of GaP on a single crystal p-type substrate of GaAs, oriented in the 100 direction. A complete description of the method used is given in copending U.S. patent application Serial No. 130,089 of Carl J. Frosch, filed August 8, 1961. Ohmic contact to the GaP was achieved by evaporating islands of silver, about 8 mils in diameter, through a mask and subsequently alloying the silver in a conventional strip heater. A junction was defined by masking an island about 25 mils in diameter with wax and etching the unit in a chlorine-alcohol etch. The wafer was then mounted in a conventional header with silver paste used to contact and attach the GaAs crystal and a point pressed against the alloyed silver island to contact the GaP epi-layer. With this device the current-voltage characteristics of FIG. 1 were obtained, with a GaAs resistivty of 0.1 ohm-cm.

While the principles of the invention have been illustrated with circuits utilizing a particular heterojunction device, it is to be understood, as pointed out in the foregoing, that other types of heterojunction devices might be used, as well as various modifications apparent to workers in the art, without departing from the spirit and scope of the invention.

What is claimed is:

1. A logarithmic function generator comprising a heterojuncion device formed of materials of the same conductivity type, one of said materials having a larger energy gap than the other, means connected in circuit with said device for applying a positive voltage to the material having the larger energy gap, said voltage varying in accordance with one applied input signal, and means connected to series with said device for extracting an output signal which is a logarithmic function of the applied input signal.

2. A logarithmic function generator as claimed in claim 1 wherein said diode materials are gallium phosphide and gallium arsenide.

3. A logarithmic function generator as claimed in claim 2 wherein the voltage applied to said diode biases the gallium phosphide positive relative to the gallium arsenide.

References Cited in the file of this patent
UNITED STATES PATENTS
3,037,129    Le Bel _____ May 29, 1962